United States Patent [19]

Young

[11] Patent Number: 5,017,669

[45] Date of Patent: May 21, 1991

[54] IMPREGNANT COMPOSITIONS FOR POROUS ARTICLES

[76] Inventor: Peter D. Young, Les Blicqs St. Andrews, Guernsey, Channel Islands, Channel Islands

[21] Appl. No.: 368,371

[22] PCT Filed: Dec. 15, 1987

[86] PCT No.: PCT/GB87/00908

§ 371 Date: Jun. 9, 1989

§ 102(e) Date: Jun. 9, 1989

[87] PCT Pub. No.: WO88/04675

PCT Pub. Date: Jun. 30, 1988

[30] Foreign Application Priority Data

Dec. 16, 1986 [GB] United Kingdom ................ 8630007
Oct. 2, 1987 [GB] United Kingdom ................ 8723173

[51] Int. Cl.$^5$ ............................................ C08F 20/26
[52] U.S. Cl. ..................................... 526/320; 526/90; 526/212
[58] Field of Search ................... 526/320, 90, 212

[56] References Cited

U.S. PATENT DOCUMENTS

Re. 32,240  9/1986  De Marco ............................ 526/209
4,069,378   1/1978  De Marco ............................ 526/209

FOREIGN PATENT DOCUMENTS 0014062   8/1980   European Pat. Off. .
0103199   3/1984   European Pat. Off. ............ 526/320
0158161  10/1985   European Pat. Off. ............ 526/320
0279007   8/1988   European Pat. Off. ............ 526/320
1254277  11/1967   Fed. Rep. of Germany ...... 526/320
48-56240  8/1973   Japan ................................. 526/320
0032612   2/1983   Japan ................................. 526/320
63-56512  3/1988   Japan ................................. 526/320
1211469  11/1970   United Kingdom .
1527448  10/1978   United Kingdom .
1547801   6/1979   United Kingdom .
2201683   9/1988   United Kingdom ................ 526/320
8100570   3/1981   World Int. Prop. O. .......... 526/320

Primary Examiner—Joseph L. Schofer
Assistant Examiner—N. Sarofin
Attorney, Agent, or Firm—Oblon, Spivak, McClelland, Maier & Neustadt

[57] ABSTRACT

The sealing of small porous rigid articles by impregnation with a liquid synthetic resin impregnant and sequent curing of resin in the pores and provides a liquid (meth)acrylic ester impregnant composition comprising a free radical catalyst, an inhibitor and a higher alkyl (meth)acrylic ester and/or polyfunctional (meth)acrylic ester which has been obtained by transesterification in the presence of an organotitanium catalyst and from which the catalyst residue has not been removed. The catalyst residue has been found to improve sealing and thermal stability of the cured impregnant.

16 Claims, No Drawings

IMPREGNANT COMPOSITIONS FOR POROUS ARTICLES

The invention relates to the sealing of small pores in porous rigid articles by impregnation with a liquid synthetic resin impregnant and subsequent curing of resin in the pores. The articles include particularly metal castings and sintered metal parts but also include materials such as wood or inorganic materials such as brick, stone or concrete.

The impregnation of metal castings with resins to seal porosity is a process which is well established. Porosity in castings is invariably inconsistent in size and shape, thus rendering the components unusable due to leakage. This is especially true where they are subjected to pressure. Apart from this well known cause for rejection of castings used in the motor industry there are many other problems caused by porosity including plating failures, "blow out" during stove enamelling, and sites for corrosion, entrapment of organic material and possible bacteria growth.

Generally, porosity can be divided into three types: through porosity, blind porosity and enclosed porosity. Through porosity causes leakage and is the type with which founders are primarily concerned. Blind porosity, having one entrance to the surface only, will not produce a leakage but can cause surface finishing problems through absorption of treatment fluids. Enclosed porosity causes no problems unless present in excess where it can cause structure failure. Other similar defects often encountered in the foundry include cold laps, cracks, blow holes, and inclusions all of which are often referred to, incorrectly, as forms of porosity. Frequently examination of a casting rejected for leakage and marked by the inspector as porous, reveals that it actually has a cold lap, crack or a blow hole.

Various methods of sealing porosity employed over the years include plugging, coating with epoxy resin, and welding. All of these techniques are highly labour intensive and therefore expensive, and there is no guarantee that the treatment will be successful.

One preferred impregnation technique for sealing porous articles comprises immersing the article in liquid impregnant under vacuum conditions in an autoclave, allowing the pressure to rise so forcing the impregnant into the pores, removing the impregnated article, washing the impregnant from the surface and curing the impregnant which remains in the pores. The article is preferably subjected to vacuum conditions before immersion in the liquid impregnant but it is also possible to immerse the article in the impregnant before drawing the vacuum in the autoclave. The washing step is desirably carried out using water and in many cases it will be desirable to include a surfactant either in the water or in the impregnant. The impregnants normally used are based on one or more esters of (meth)acrylic acid, at least some of esters being derived from polyfunctional alcohols in order to provide cross linking on curing. The impregnant will normally contain a free radical-producing curing agent such as a peroxide or azo compound and an inhibitor such as a sterically hindered phenolic compound. It is also desirable to include a small amount of metal chelating agent. Compositions catalysed by peroxy compounds and azo compounds can be heat-cured e.g. by immersing the article in hot water at say 90° C. Anaerobically curing compositions on the other hand require peroxy catalysts.

The impregnant compositions should have a sufficiently low viscosity to permit them to be drawn into the pores of the article (it should be noted in this connection that metal castings tend to have smaller pores than sintered metal articles). On the other hand, too low a viscosity encourages unwanted leaching out of impregnant from the pores during the washing step. Also, of course, water solubility has to be taken into account if an aqueous wash liquid is used. Furthermore, impregnants of low volatility clearly have to be used in order to avoid boiling off under vacuum conditions. A low surface tension liquid impregnant is also desirable since it permits wetting of the metal in the pores and improves adhesion of the cured resin.

The storage and curing properties of the impregnant composition can be appropriately adjusted by varying the proportions of the catalyst and the inhibitor. My U.K. Patent No. 1,547,801 describes various compositions which are stable at room temperature and which may be cured at 90° C. in a water bath in a period from 3 to 15 minutes. Further compositions of this type are disclosed in European Patent No. 14062 of Loctite (Ireland) Limited. Anaerobically curing systems are for example described in UK Patent No. 1,527,448 of Loctite Corporation. These documents describe examples of impregnant compositions of the type with which the present invention is concerned and give examples of monomers, catalysts and inhibitors together with the proportions in which they may be used.

As further background prior art, it should be mentioned that Japanese Patent Application No. 56-130182 (Kokai No. 58-32612) of Chuo Hatsumei Kenkyusho K. K. describes an impregnant based on (meth)acrylic esters. A "titanium coupling agent" may be included for lowering the surface tension and improving adhesion to metal, but no examples of such coupling agents are given.

According to a principal aspect of the present invention, there is provided a liquid (meth)acrylic ester impregnant composition comprising a free radical catalyst, an inhibitor and a higher alkyl and/or polyfunctional (meth)acrylic ester which has been obtained by transesterification in the presence of an organotitanium catalyst and from which the catalyst residue has not been removed. The composition is preferably room temperature-stable (without aeration) and hot water-curable and the preferred transesterification catalyst is tetra-isopropyl titanate. While impregnants of the invention will normally be sold with the free radical catalyst mixed in, it is envisaged that the catalyst may be supplied in a separate pack for addition by the customer.

According to a second aspect of the invention there is therefore provided a liquid (meth)acrylic ester impregnant composition comprising a hydroxyalkyl (meth)acrylate, a higher alkyl (meth)acrylate and a polyfunctional (meth)acrylate, at least one of the higher alkyl or polyfunctional (meth)acrylic ester being a (meth)acrylic ester which has been obtained by transesterification in the presence of an organotitanium catalyst and from which the catalyst residue has not been removed.

According to another aspect of the invention, there is provided a process for preparing a liquid (meth)acrylic ester impregnant composition which comprises reacting a lower alkyl (meth)acrylate with a higher alcohol in the presence of an organotitanium catalyst to provide a higher alkyl (meth)acrylate, and adding a polyfunctional (meth)acrylate and/or a hydroxyalkyl (meth)a- crylate to the reaction product without removal of the organotitanium catalyst.

According to a further aspect of the invention, there is provided a process for preparing a liquid (meth)acrylate ester impregnant composition which comprises reacting a lower alkyl (meth)acrylate with a polyfunctional alcohol, such as a glycol or a polyalkylene glycol, in the presence of an organotitanium catalyst to provide a polyfunctional (meth)acrylate and adding a higher alkyl (meth)acrylate and/or a hydroxyalkyl (meth)acrylate to the reaction product without removal of the organotitanium catalyst.

The most preferred impregnant compositions with which the invention is concerned include as polyfunctional (meth)acrylate, polyethylene glycol dimethacrylate, triethylene glycol dimethacrylate, trimethylol propane trimethacrylate and tetraethylene glycol dimethacrylate. As explained in U.K. Patent No. 1,547,801, it is, however, desirable to include some monofunctional (meth)acrylate because the monofunctional compounds are more stable and less susceptible to anaerobic effects. Furthermore, wholly polyfunctional (meth)acrylate esters tend to shrink on curing to a greater extent than mixtures with monofunctional esters which can lead to leakage problems. Polyfunctional (meth)acrylate ester resins are also more brittle so that a plasticising effect is necessary to give the necessary properties; the plasticising effect may be obtained by incorporating a conventional resin plasticiser such as dioctyl phthalate or it may be obtained by using a monofunctional (meth)acrylate comonomer. Lower e.g. $C_1$ to $C_3$ monofunctional (meth)acrylates such as methyl (meth)acrylate tend to be too volatile and $C_{10}$ to $C_{14}$ alkyl (meth)acrylates are more preferred. It is also desirable to include a hydrophilic alkyl (meth)acrylate such as hydroxypropyl methacrylate or hydroxyethyl acrylate to facilitate washing and to improve adhesion of the cured resin.

Among suitable monofunctional esters are those having the formula:

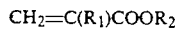

where $R_1$ is H or $CH_3$, $R_2$ is $C_n H_{2n+1}$ or $C_m H_{2m}OH$ (where n is 4-18, preferably 4-14, particularly 10-14 and m has similar values except that the minimum value can be as low as 2), $CH_2CH_2O(CH_2CH_2O)_xH$ or $CH_2CH(CH_3)0(CH_2CH_2(CH_3)0)_xH$, where x is 0 to 10 (the units optionally being reversed in the case of propylene glycol). As examples, butyl acrylate, hydroxypropyl acrylate, 2-ethyl-hexyl acrylate, lauryl methacrylate, tridecyl methacrylate and stearyl methacrylate may be cited. Although many monoesters of acrylic and/or methacrylic acid may be employed, the actual choice will be governed on the one hand by avoidance of too high a volatility and on the other by the desirability of a low viscosity. At least sufficient polyfunctional monomer should also be present in order to provide a cross-linked resin on curing.

The proportion of polyfunctional (meth)acrylate ester monomer may vary depending on the degree of solvent and heat resistance expected of the sealed article but is desirably in the range 2-70% of the impregnant and preferably lies in the range 2-40% most preferably 5-25%. The upper limit is determined in part by economic considerations as the polyfunctional esters are more expensive. More important is the fact that monofunctional acrylates or methacrylates appear to be more stable and less susceptible to anaerobic effects than polyfunctional monomers. It is a feature of the preferred process that curing takes place in hot water even in the presence of some dissolved air. Systems which exhibit too great an anaerobic effect can cause difficulties with certain particularly active metal alloys. In extreme cases of anaerobic systems, particularly where a sintered component is involved, a thin film of partially cured resin is already present on removal from the autoclave and this is difficult to remove by washing and results in dirty products.

Although the preferred impregnants are substantially wholly (meth)acrylate ester (at least as far as the monomers are concerned), other monomers such as diallyl phthalate or esters based on maleates or fumarates may also be included in small quantities, as may non-polymerisable extenders such as phthalate esters e.g. dibutyl phthalate or dioctyl phthalate. Too high a proportion of extender should be avoided as castings in contact with solvents may develop microporosity due to migration of the extender.

It may be convenient to include surfactants (which term includes emulsifying agents, wetting agents and detergents) in the impregnant as an aid to subsequent water washing. The choice of surfactant will be based on the usual principles and will be determined by the actual composition of the impregnant. In general the most useful surfactants will be found amongst those recommended for use with liquids of high polarity rather than those designed for emulsification of paraffinic oils. Although cationic and anionic surfactants can be used, non-ionic surfactants of the ethoxylated and propoxylated alcohol type are preferred, e.g. at 0.1 to 1% concentration if added to the wash water or 1 to 10% if present in the impregnant. Sodium metasilicate at a level of about 1% has been found to be effective in the wash water.

Many catalysts and inhibitors have been found satisfactory for the operation of the preferred impregnation process. The principle governing the choice is that the combination should desirably give rise to an impregnant, a sample of which when placed in a test tube at 90° C. should gel in a time of between 1 to 15 minutes and preferably 1.5 to 5 minutes. Typically the quantities may be selected within the range 0.1-15%, preferably 1-5% catalyst and 0.01-2% inhibitor. A wide range of catalysts including benzoyl peroxide, methyl ethyl ketone peroxide, various alkyl peresters, cumene hydroperoxide and azo catalysts such as AZBN (azobisisobutyronitrile) have been found suitable. A similarly wide selection of inhibitors has been found suitable, including those in common use such as hydroquinone, substituted hydroquinones such as methoxyhydroquinone, p-cresol and m-cresol, and various hindered alkyl phenols such as 2,6-di-tert-butyl p-cresol and 2,5-di-tert-butyl hydroquinone; methylene blue is also useful. The viscosity of such an impregnant has been found to remain almost constant when the throughput of castings is such that there is a residence time for the impregnant in the autoclave of several weeks.

Various metal ion chelators of the type described in European Patent No. 14062 may also be included in the impregnant.

The time required for impregnation varies with the type of product. In practice a time of 10 minutes at a vacuum of 2-5 mm of Hg has been found sufficient for the majority of commercially available castings. In the case of one small sintered iron component 3 minutes was found sufficient whereas in another instance impregnation of wood was found to require 30 minutes. In no instance was pressure required.

Various methods of conveying the articles through the stages of the process may be used. Generally it is found convenient to pack medium sized castings in baskets constructed of steel mesh. Thus on removal from the impregnant, the basket can be drained over a draining tray and it is advantageous if the angle of tilt of the baskets can be altered to allow more thorough draining.

Immersion of the articles in a water or water plus detergent tank allows impregnant to be worked from the surface within 10 minutes. Agitation should be provided to facilitate this process. The use of water as a washing medium is both economical and safer than the use of solvents. One of the greatest deterrents to widespread use of impregnation equipment is connected with effluent disposal problems. It is a feature of the process that apart from the methods available to break emulsions which will be familiar to those accustomed to dealing with the disposal of cutting oils, a simpler method has been found possible. Thus when the level of emulsified impregnant has built up to a concentration of 1–5%, the wash liquors may be pumped to a separate tank capable of raising the temperature above 80° C. For example after only 2 minutes at 100° C., the emulsion suddenly curdles and on cooling, the nearly clear supernatent liquid may be drained into the sewer leaving a damp granular solid which, being a polymer, may be disposed of as an inoffensive almost odourless solid waste. At 90° C. curdling may take 20 minutes.

Following rinsing, the articles are drained for a few moments and then transferred to the curing tank. The use of hot water to cure the impregnant offers several advantages over other alternative procedures. The hot water acts as an additional washing medium to remove traces of partially emulsified impregnant from the surface of the casting, particularly from the inside of tapped holes. It is commonly found that processes employing oven curing result in dirty castings and this imposes limitations on the type of casting which may be sealed by this method. Another advantage in curing in hot water arises from the fact that, as is well known, many monomers of which methacrylates and styrene are examples are inhibited by air and consequently satisfactory curing of resin takes place even at the surface of the pores where the water acts as a barrier. With low viscosity impregnants there is obviously a risk that hot oils or solvents might leach impregnant from the larger pores before curing could take place. The use of hot water has been found to be satisfactory in this respect. Thus plating processes, to be successful, require that the level of resin in the pores should be such that entrapment of plating fluids beneath the metal plating is avoided. Satisfactory plating of sintered parts has been shown to be possible using the process of the invention. It is also convenient that on removal of castings from the hot water almost immediate evaporation of water occurs and when cool, the castings are immediately ready for pressure testing or any further engineering operations.

The temperature of the water in the curing tank should be such that an adequate margin exists for curing the monomer in the time allotted for immersion. In a preferred embodiment of the invention the impregnant will have a curing time at 90° C. of 10–15 minutes. It will be clear that at temperatures above 95° C. the presence of steam will become increasingly inconvenient. Below 70° C., the required immersion time to ensure satisfactory curing lengthens considerably unless the catalyst/inhibitor balance is altered. However this implies that the stability of the impregnant in the autoclave is reduced. It is therefore desirable that the curing temperature should be in the range 80° C.–95° C. and preferably close to 90° C.

A feature of the preferred process is therefore that although several stages are involved, none require longer than 10 minutes and this allows a sequence of baskets containing castings to be processed in an unusually compact design of plant.

Although vacuum impregnation is the preferred method of carrying out the process, pressure impregnation could be used or indeed the article could simply be dipped into the impregnant.

Higher alkyl (meth)acrylates and polyfunctional (meth)acrylates are normally manufactured in practice by a transesterification, or more correctly alcoholysis, reaction, between methyl (meth)acrylate, a suitable higher alcohol and a catalyst in a suitable proportion for effecting the reaction within a suitable time at a convenient temperature. As mentioned above, the higher alkyl (meth)acrylates useful for the present invention are generally $C_4$–$C_{18}$ alkyl, preferably $C_4$–$C_{14}$ alkyl and particularly $C_{10}$–$C_{14}$ alkyl.

The higher alcohol reacts with the methyl (meth)acrylate at temperatures around 100° C. (50°–150° C.) to produce higher alkyl (meth)acrylate and methanol, the latter being removed from the reaction zone in order to drive the reaction to completion. The alcoholysis reaction will often be carried out using a stoichiometric excess of methyl (meth)acrylate to ensure complete conversion of higher alcohol to ester. It is also common practice to include a hydrocarbon solvent such as cyclohexane or benzene in the reaction mixture to facilitate the separation and removal of the by-product methanol from the methyl (meth)acrylate reactant via an azeotropic distillation. Inhibitors, such as substituted phenols or other inhibitors, will also be included to prevent premature polymerisation of the monomers during the reaction.

Upon completion of the reaction, indicated by cessation of methanol evolution, it is usual to purify the products prior to use first by removing any volatile materials such as excess methyl (meth)acrylate by distillation under vacuum and then to vacuum distil the product itself. Should the product have such a high boiling point as to render distillation difficult or impossible without polymerisation the product would be purified by treatment in the liquid state to adsorb and remove catalyst residues or coloured bodies etc.

Treatment can also take a form whereby catalyst residues are reacted, e.g. by alkaline hydrolysis, to render them insoluble so that they precipitate from the product and can be removed by a suitable means such as filtration, centrifugation, or adsorption onto charcoal prior to filtration. Such purification stages are both time consuming and lead to yield losses and therefore add significantly to the cost of manufacturing higher alkyl (meth)acrylates and polyfunctional (meth)acrylates.

We have now found, according to the invention, that it is not necessary to remove the catalyst, and that the higher alkyl or polyfunctional (meth)acrylate can be used in the condition that appertains after reaction and removal of by-products such as excess methyl (meth)acrylate and methanol. The use of higher alkyl and polyfunctional (meth)acrylates without removal of the catalyst in an impregnant composition lowers the surface tension of the composition leading to improved wetting and adhesion. Cured impregnants also show greater stability when subjected to elevated temperature conditions such as 200° C. The omission of the step of removing the catalyst also reduces the cost of producing the impregnant composition.

The catalyst normally used for the alcoholysis transesterification process is an organometallic titanium compound, particularly a tetra lower alkyl orthotitanate such as tetra isopropyl titanate or tetra-n-butyl titanate, or the titanate of the relevant higher alcohol could also be used. Titanates are effective transesterification catalysts as they do not promote side reactions and only require moderate temperatures.

Thus according to a further aspect of the invention there is provided a liquid (meth)acrylic ester impregnant composition for porous articles comprising an organometallic titanium compound which is preferably soluble therein, preferably a tetra alkyl orthotitanate or the titanium compound derived therefrom during the course of transesterification. In this connection, it has been found that adding a similar amount of titanium catalyst to an impregnant composition made from purified monomers from which the original catalyst has been removed is generally less satisfactory e.g. because the added titanium compound tends to precipitate out. It is now believed that the catalyst residue normally removed from the transesterification product is the tetra-alkoxide derived from the higher alkyl group or the polyfunctional alkyl group and not the original catalyst (which is more susceptible to hydrolysis). It is also believed that hydroxyalkyl (meth)acrylate esters may play a part in binding the catalyst residue.

It is accordingly within the ambit of the invention, though much less preferred, to add an organotitanium compound such as a higher alkyl titanate, to a purified monomer system.

According to yet another aspect, the invention provides a process for preparing a liquid (meth)acrylate ester impregnant composition which comprises reacting a lower alkyl (meth)acrylate with a higher alcohol and a polyfunctional alcohol or a mixture thereof, either alone or together, in the presence of an organo titanium catalyst to provide a mixed (meth)acrylate ester composition and adding one or more other desirable (meth)acrylate esters such as hydroxyalkyl (meth)acrylates, polyalkylene glycol mono(meth)acrylates, (meth)acrylate containing oligomers etc.

Our experiments have shown that it is desirable for the impregnant to contain at least 50, preferably 100–1000, ppm Ti derived from the transesterification catalyst.

EXAMPLES

A range of impregnation compositions (sealants) was prepared using monomers prepared and purified to a normal commercial quality and also monomers according to this invention in which the tetra-isopropyl titanate esterification catalyst was allowed to remain in the monomer. These sealants were subjected to a series of evaluation tests as detailed below.

Sealing Performance

Annular sintered iron test rings of 20% pore volume and dimensions 25 mm outside diameter, 14 mm inside diameter, and 14 mm height were impregnated using a wet vacuum technique. This consisted of immersing the rings in the sealant and subjecting them to vacuum of 5 mbar for 10 minutes to remove air from the porosity, and releasing the vacuum to atmospheric pressure to fill the pores with sealant. The rings were removed from the sealant, allowed to drain, washed with water and the sealant polymerised in the pores by immersing the rings in hot water at 90° C. for 10 minutes. The rings were pressure tested under water with air at 90 'psi' pressure and assessed for leaks on a 0–5 scale with 0 signifying no leakage and 5 a level of leakage at which castings (as opposed to tests rings) might not be 100% sealed.

Thermal Stability

Small samples of sealant were polymerised in 3 mm diameter test-tubes for 30 minutes at 90° C. The samples were removed from the test-tubes and the percentage loss in weight determined after 1 hour and 24 hours, at 150° C. and 200° C. The percentage loss in sealant weight was also determined under the same conditions but using impregnated sintered metal test rings as described above.

Gel Time

A 5 ml sample of sealant was heated in a test-tube in a water bath at 90° C. The time taken for polymerisation to proceed to a point where the tube and its contents could be lifted from the water bath on the end of a piece of wire immersed in the sealant was determined.

The following three sealant formulations were prepared with the amounts being given in parts by weight.

|  | 1 | 2 | 3 |
|---|---|---|---|
| Hydroxypropyl methacrylate | 65 | 65 | 65 |
| Lauryl methacrylate | 15 | — | — |
| Lauryl methacrylate (inc. catalyst residue 600 ppm as Ti) | — | 15 | 15 |
| Triethylene glycol dimethacrylate | 20 | 20 | — |
| Triethylene glycol dimethacrylate (inc. catalyst residue 1000 ppm as Ti) | — | — | 20 |
| Azobisisobutyronitrile | 0.4 | 0.4 | 0.4 |
| Inhibitor (sterically hindered substituted phenol) | 0.15 | 0.15 | 0.15 |
| Residual Ti in ppm (based on whole formulation) | 0 | 90 | 290 |

Results of the various tests are given in the table below:

|  |  | 1 | 2 | 3 |
|---|---|---|---|---|
| Gel time @ 90° C. Min |  | 1.25 | 1.0 | 1.2 |
| % Wt loss at 200° C. |  |  |  |  |
| Test piece | (1) 1 Hr | 3.2 | 3.3 | 1.7 |
|  | (2) 24 Hrs | 51 | 32 | 9.0 |
| Test Ring | (1) 1 Hr | 7.4 | 5.1 | 6.3 |
|  | (2) 24 Hrs | 56 | 26 | 21 |
| Test Ring Sealing Rating: |  |  |  |  |
| After polymerisation |  | 3 | 2 | 0 |
| After 1 Hr @ 150° C. |  | 3+ | 3 | 0 |
| After 24 Hrs @ 150° C. |  | 4 | 4 | 0 |
| After 1 Hr @ 200° C. |  | 5 | 4 | 0 |
| After 24 Hrs @ 200° C. |  | 5+ | 4+ | 0 |

The results quoted are the average of duplicate tests and they clearly indicate the superior sealing performance and improved thermal stability of the sealants of the invention.

The following five sealant formulations were prepared with the amounts being given in parts by weight.

|  | 4 | 5 | 6 | 7 | 8 |
|---|---|---|---|---|---|
| Hydroxypropyl methacrylate | 25 | 25 | 25 | 25 | 25 |
| Tridecyl methacrylate (purified) | 70 | 52.5 | 35 | 17.5 | — |
| Tridecyl methacrylate (including catalyst residue 150 ppm as Ti) | — | 17.5 | 35 | 52.5 | 70 |
| Trimethylolpropane Trimethacrylate | 5 | 5 | 5 | 5 | 5 |
| Azobisobutyronitrile | 0.4 | 0.4 | 0.4 | 0.4 | 0.4 |
| Inhibitor (sterically hindered substituted phenol) | 0.15 | 0.15 | 0.15 | 0.15 | 0.15 |
| Residual Ti in ppm | 0 | 26 | 52.5 | 79 | 105 |
| % Wt loss at 200° C. | | | | | |
| Test piece  1 hour | 6.3 | 2.8 | 3.2 | 3.4 | 3.0 |
|              24 hours | 63.4 | 43.0 | 16.3 | 17.6 | 16.3 |
| Test ring   1 hour | 4.9 | 6.5 | 7.1 | 6.4 | 4.1 |
|              24 hours | 29.6 | 29.5 | 27.5 | 24.2 | 25.5 |
| Test ring sealing rating | | | | | |
| After polymerisation | 0 | 0 | 0 | 0 | 0 |
| After 1 hour at 200° C. | 1 | 0 | 0 | 0 | 0 |
| After 24 hours at 200° C. | 1 | 2 | 0 | 0 | 0 |

It will be apparent from the Formulations 4–8 that good sealing is achieved and this is primarily attributable to the high proportion of tridecyl methacrylate which gives flexibility to the cured product. The 5% polyfunctional methacrylate is in fact sufficient to make the resin thermosetting. On the other hand the presence of Ti increases thermal stability markedly.

I claim:

1. A liquid (meth)acrylic ester impregnant composition comprising a free radical catalyst, an inhibitor and a higher alkyl (meth)acrylic ester and/or polyfunctional (meth)acrylic ester which has been obtained by transesterification in the presence of an organotitanium catalyst and from which the catalyst residue has not been removed.

2. A composition according to claim 1, which is room temperature-stable and hot water-curable.

3. A composition according to claim 1, organotitanium wherein said catakyst comprises an alkyl titanate.

4. A composition according to claim 3, wherein the alkyl titanate is tetra-isopropyl titanate or tetra-n-butyl titanate.

5. A composition according to claim 1, which contains 50–1000 ppm of Ti.

6. A composition according to claim 1, which comprises a hydroxyalkyl (meth)acrylate, a higher alkyl (meth)acrylate and a polyfunctional (meth)acrylate.

7. A composition according to claim 6, wherein the monomers are in the proportions 25–65% hydroxyalkyl (meth)acrylate, 15–70% higher alkyl (meth)acrylate and 5–20% polyfunctional (meth)acrylate.

8. A composition according to claim 6 or 7, wherein the hydroxyalkyl (meth)acrylate is hydroxypropyl methacrylate, the higher alkyl (meth)acrylate is lauryl or tridecyl methacrylate and the polyfunctional (meth)acrylate is triethylene glycol dimethacrylate or trimethylol-propane trimethacrylate.

9. A liquid (meth)acrylic ester impregnant composition comprising a hydroxyalkyl (meth)acrylate, a higher alkyl (meth)acrylate and a polyfunctional (meth)acrylate, at least one of the higher alkyl or polyfunctional (meth)acrylic ester being a (meth)acrylic ester which has been obtained by transesterification in the presence of an organotitanium catalyst and from which the catalyst residue has not been removed.

10. A composition according to claim 1 which comprises in parts by weight:

| Hydroxypropyl methacrylate | 65 |
|---|---|
| Lauryl methacrylate (inc. catalyst residue 600 ppm as Ti) | 15 |
| Triethylene glycol dimethacrylate | 20 |
| Azobisisobutyronitrile | 0.4 |
| Inhibitor (sterically hindered substituted phenol) | 0.15 |
| Residual Ti in ppm (based on whole formulation) | 90 |

11. A composition according to claim 1 which comprises in parts by weight:

| Hydroxypropyl methacrylate | 65 |
|---|---|
| Lauryl methacrylate (inc. catalyst residue 600 ppm as Ti) | 15 |
| Triethylene glycol dimethacrylate (inc. catalyst residue 1000 ppm as Ti) | 20 |
| Azobisisobutyronitrile | 0.4 |
| Inhibitor (sterically hindered substituted phenol) | 0.15 |
| Residual Ti in ppm (based on whole formulation) | 290 |

12. A composition according to claim 1 which comprises in parts by weight:

| Hydroxypropyl methacrylate | 25 |
|---|---|
| Tridecyl methacrylate (including catalyst residue 150 ppm as Ti) | 70 |
| Trimethylolpropane trimethacrylate | 5 |
| Azobisisobutyronitrile | 0.4 |
| Inhibitor (sterically hindered substituted phenol) | 0.15 |
| Residual Ti in ppm | 105 |

13. A composition according to claim 1 which comprises in parts by weight:

| Hydroxypropyl methacrylate | 25 |
|---|---|
| Tridecyl methacrylate (purified) | 52.5 |
| Tridecyl methacrylate (including catalyst residue 150 ppm as Ti) | 17.5 |
| Trimethylolpropane trimethacrylate | 5 |
| Azobisisobutyronitrile | 0.4 |
| Inhibitor (sterically hindered substituted phenol) | 0.15 |
| Residual Ti in ppm | 26 |

14. A composition according to claim 1 which comprises in parts by weight:

| Hydroxypropyl methacrylate | 25 |
|---|---|
| Tridecyl methacrylate (purified) | 35 |
| Tridecyl methacrylate (including catalyst residue 150 ppm as Ti) | 35 |
| Trimethylolpropane trimethacrylate | 5 |
| Azobisisobutyronitrile | 0.4 |

| -continued | |
|---|---|
| Inhibitor (sterically hindered substituted phenol) | 0.15 |
| Residual Ti in ppm | 52.5 |

15. A composition according to claim 1 which comprises in parts by weight:

| | |
|---|---|
| Hydroxypropyl methacrylate | 25 |
| Tridecyl methacrylate (purified) | 17.5 |

| -continued | |
|---|---|
| Tridecyl methacrylate (including catalyst residue 150 ppm as Ti) | 52.5 |
| Trimethylolpropane trimethacrylate | 5 |
| Azobisisobutyronitrile | 0.4 |
| Inhibitor (sterically hindered substituted phenol) | 0.15 |
| Residual Ti in ppm | 79 |

16. A composition according to claim 1 wherein the higher alkyl (meth)acrylate comprises a $C_{10}$–$C_{14}$-alkyl (meth)acrylate.

* * * * *